May 11, 1943.  W. A. WEIGHTMAN  2,319,095
PRESS WELDING MACHINE
Filed Aug. 25, 1939  12 Sheets-Sheet 1
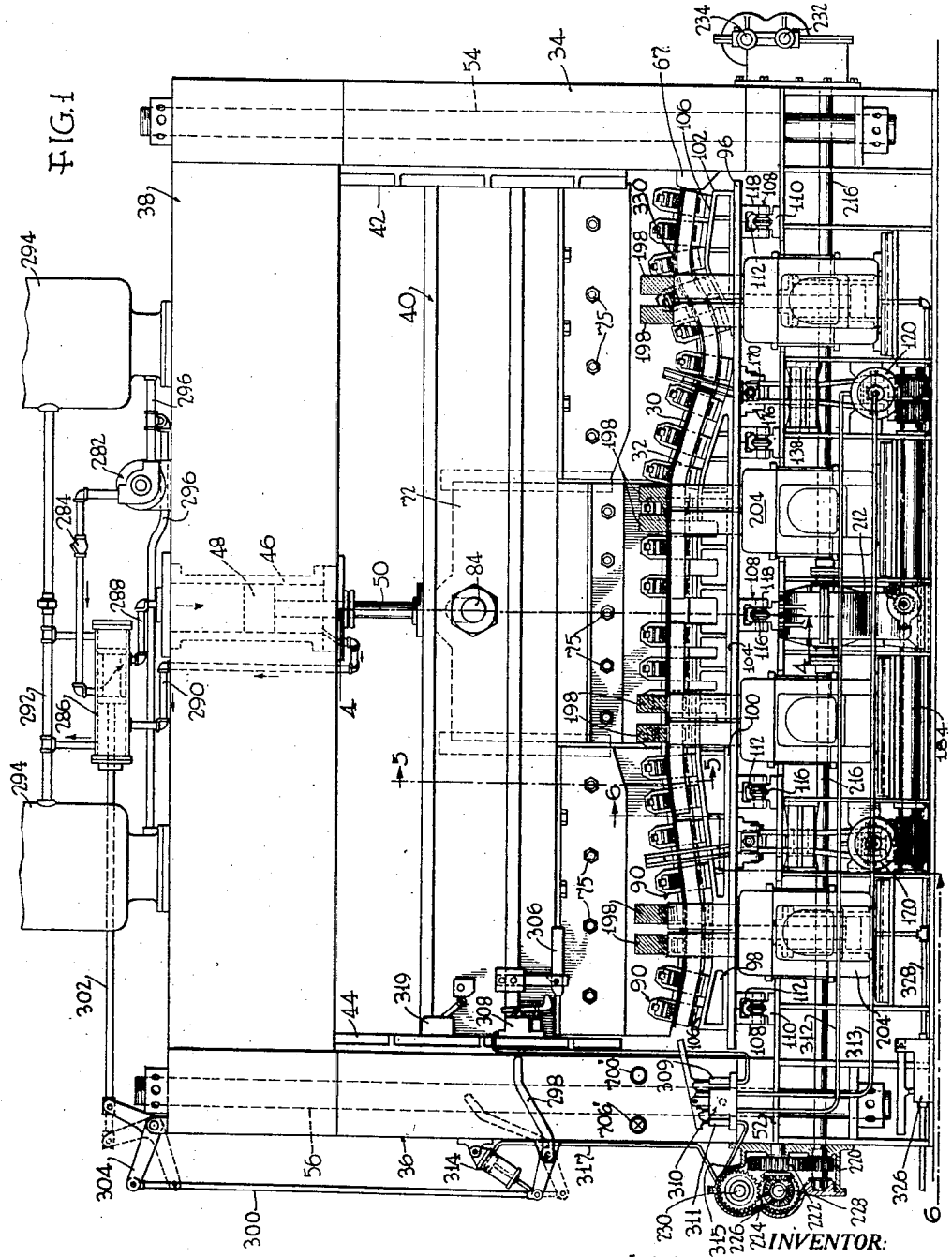
INVENTOR:
William A. Weightman.
BY John P. Tabor
ATTORNEY

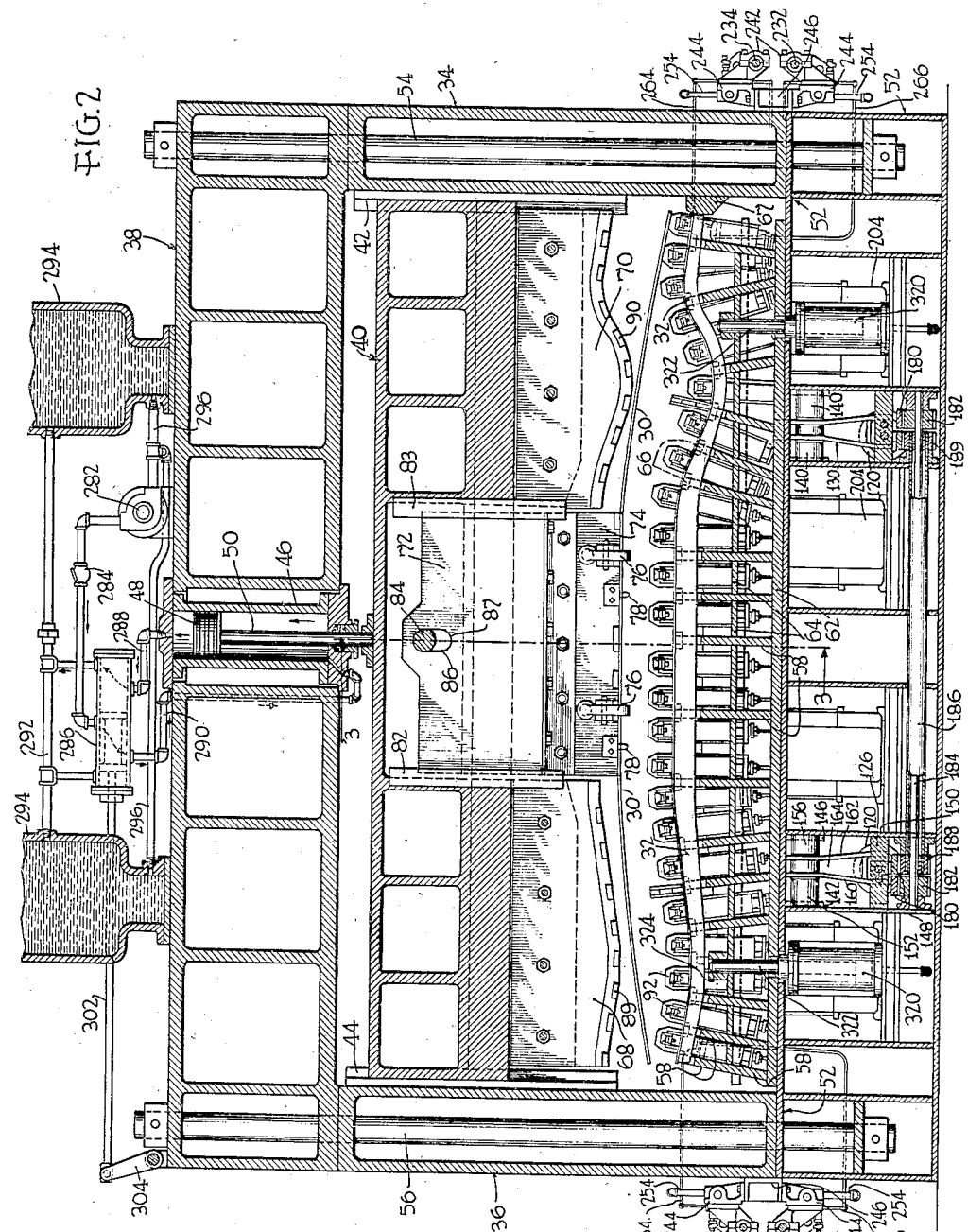

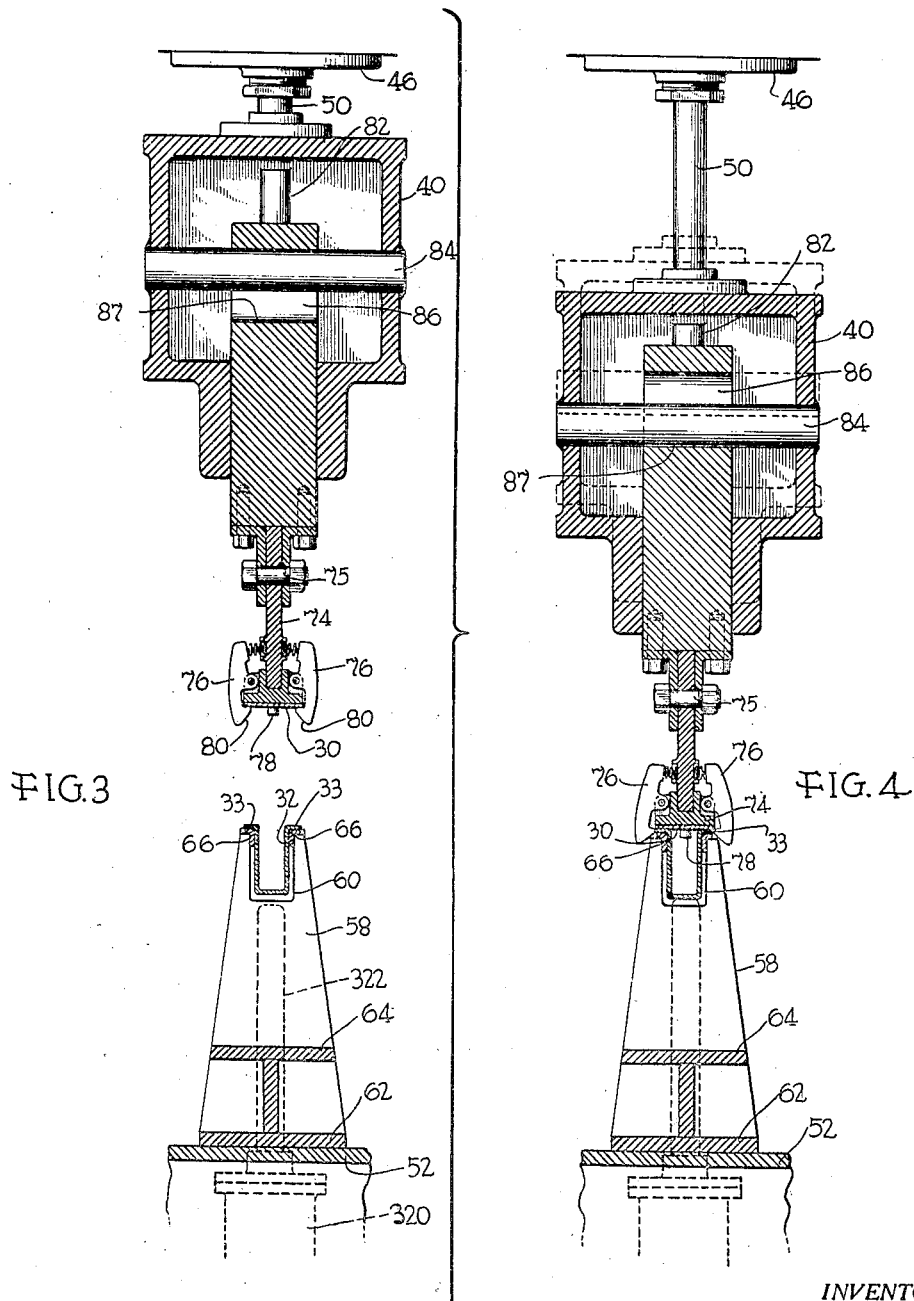

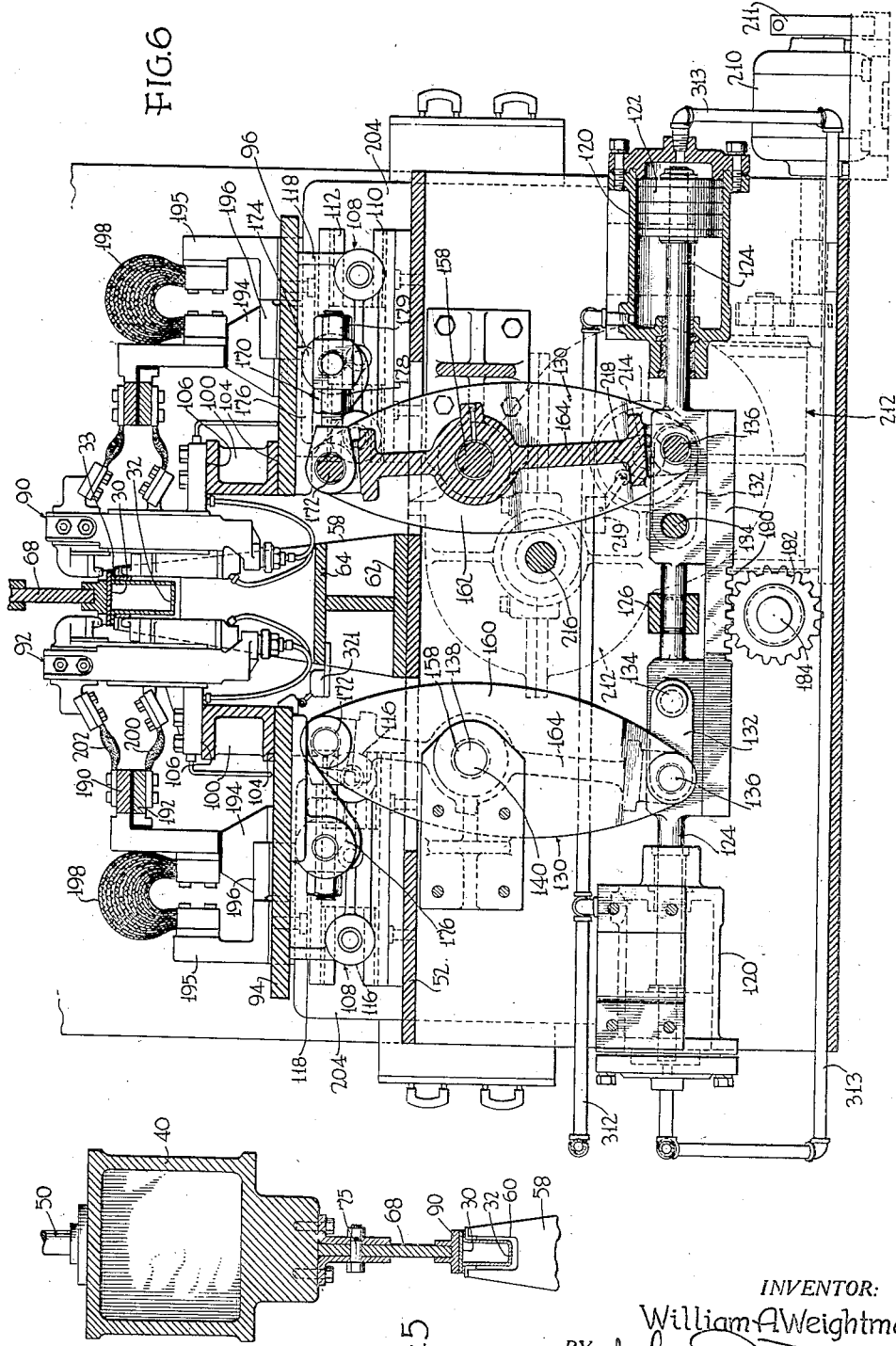

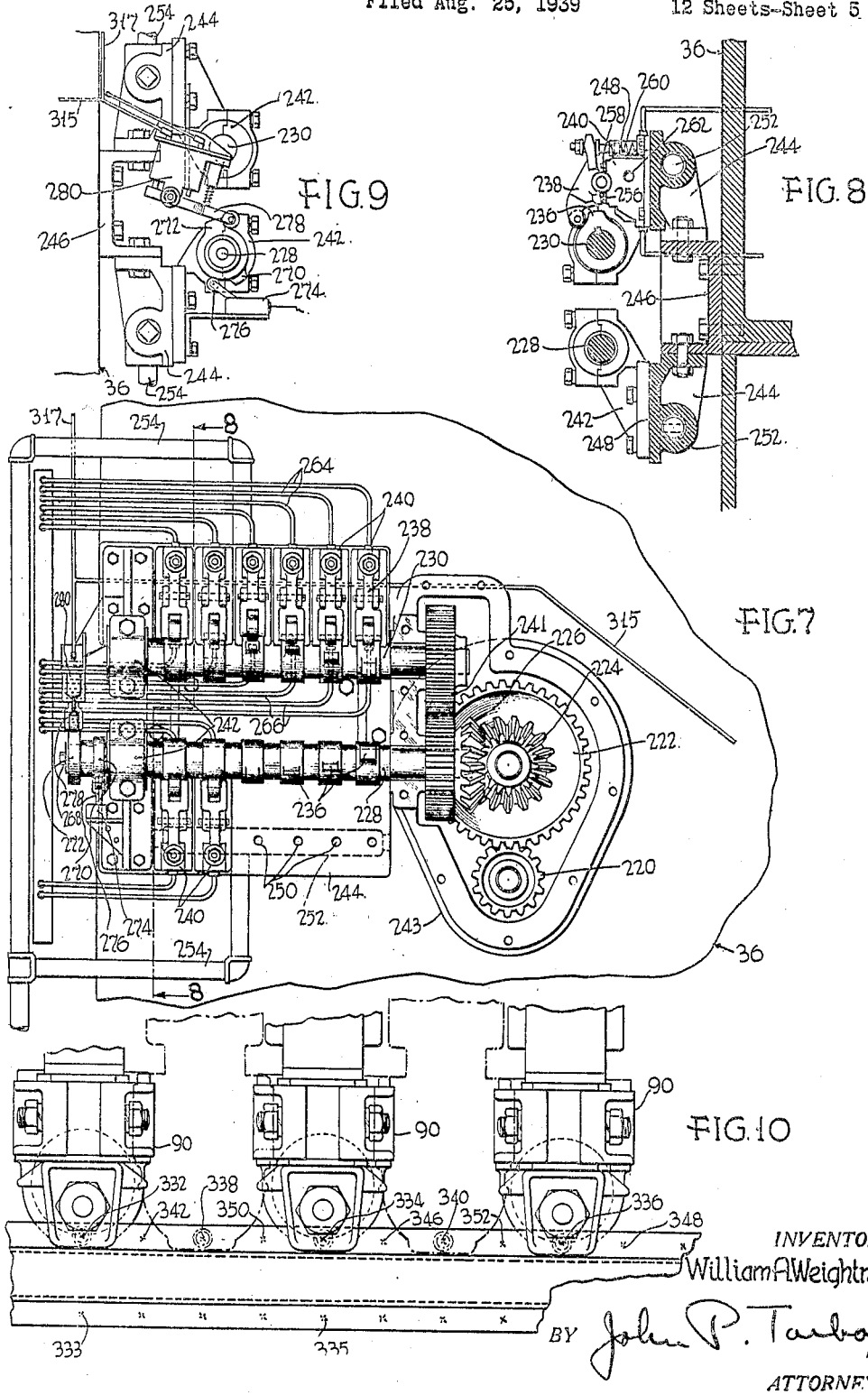

May 11, 1943.  W. A. WEIGHTMAN  2,319,095
PRESS WELDING MACHINE
Filed Aug. 25, 1939   12 Sheets-Sheet 6
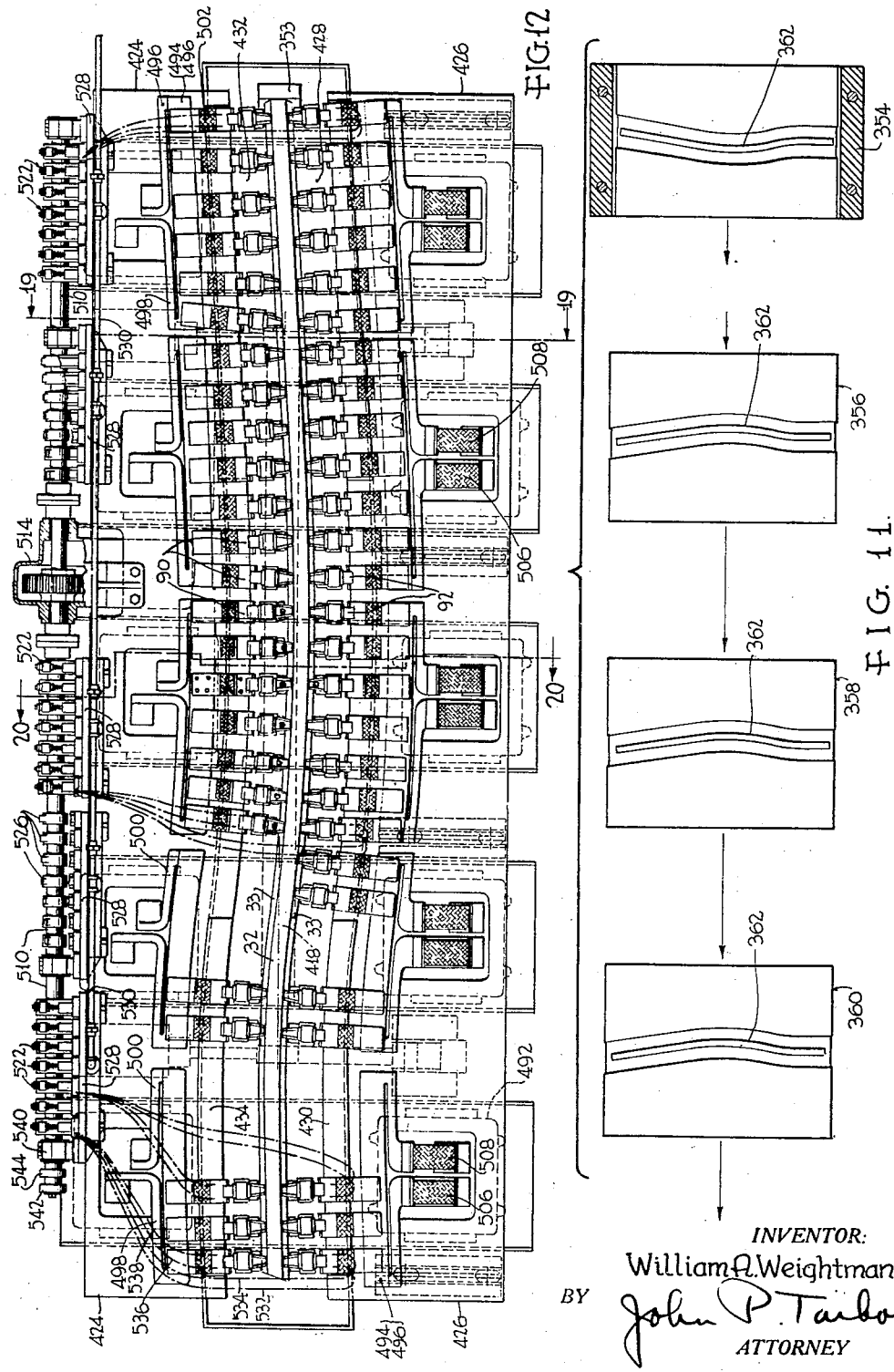
INVENTOR:
William A. Weightman.
BY John P. Tarbox
ATTORNEY May 11, 1943.  W. A. WEIGHTMAN  2,319,095
PRESS WELDING MACHINE
Filed Aug. 25, 1939   12 Sheets-Sheet 7.
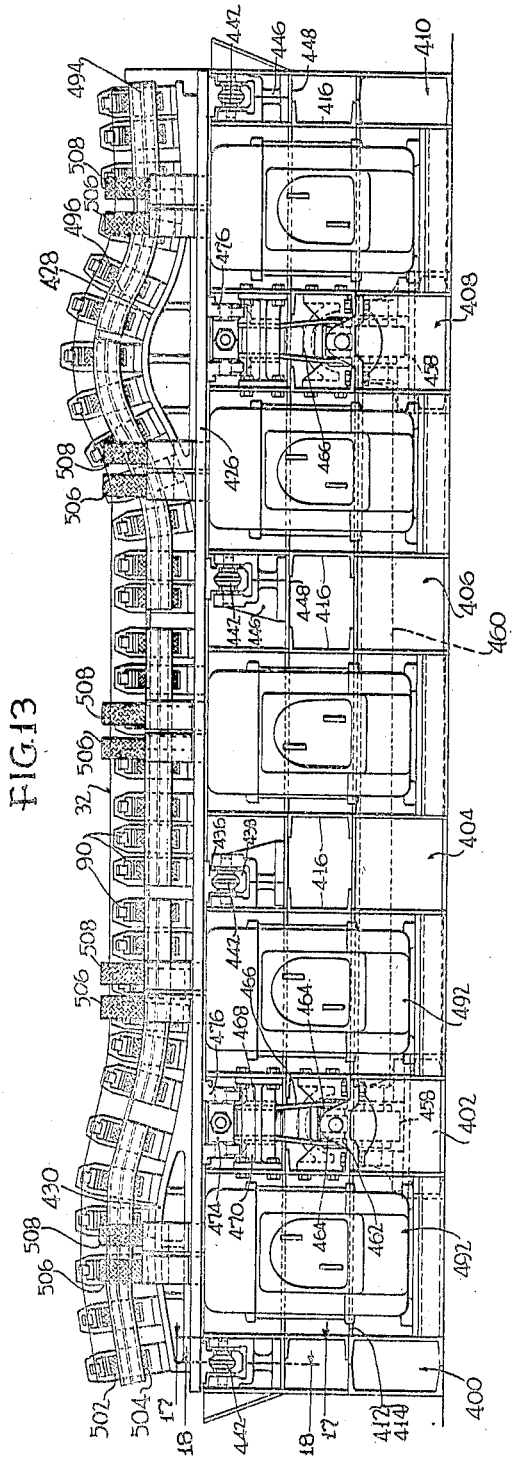
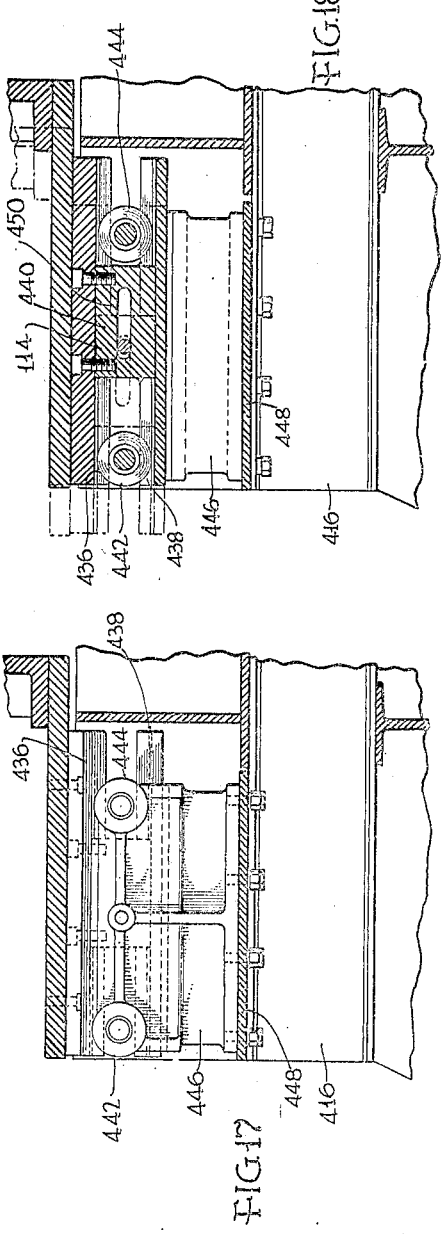
INVENTOR:
William A. Weightman
BY
ATTORNEY

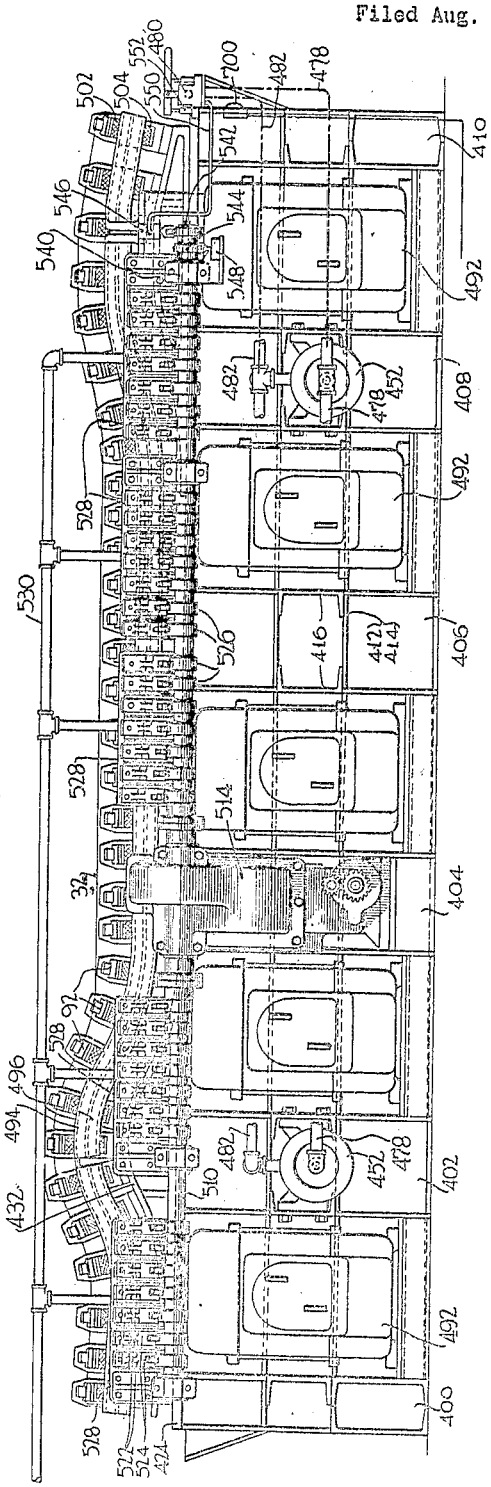

May 11, 1943. W. A. WEIGHTMAN 2,319,095
PRESS WELDING MACHINE
Filed Aug. 25, 1939 12 Sheets-Sheet 9

INVENTOR
William A. Weightman
BY John P. Tarbox
ATTORNEY

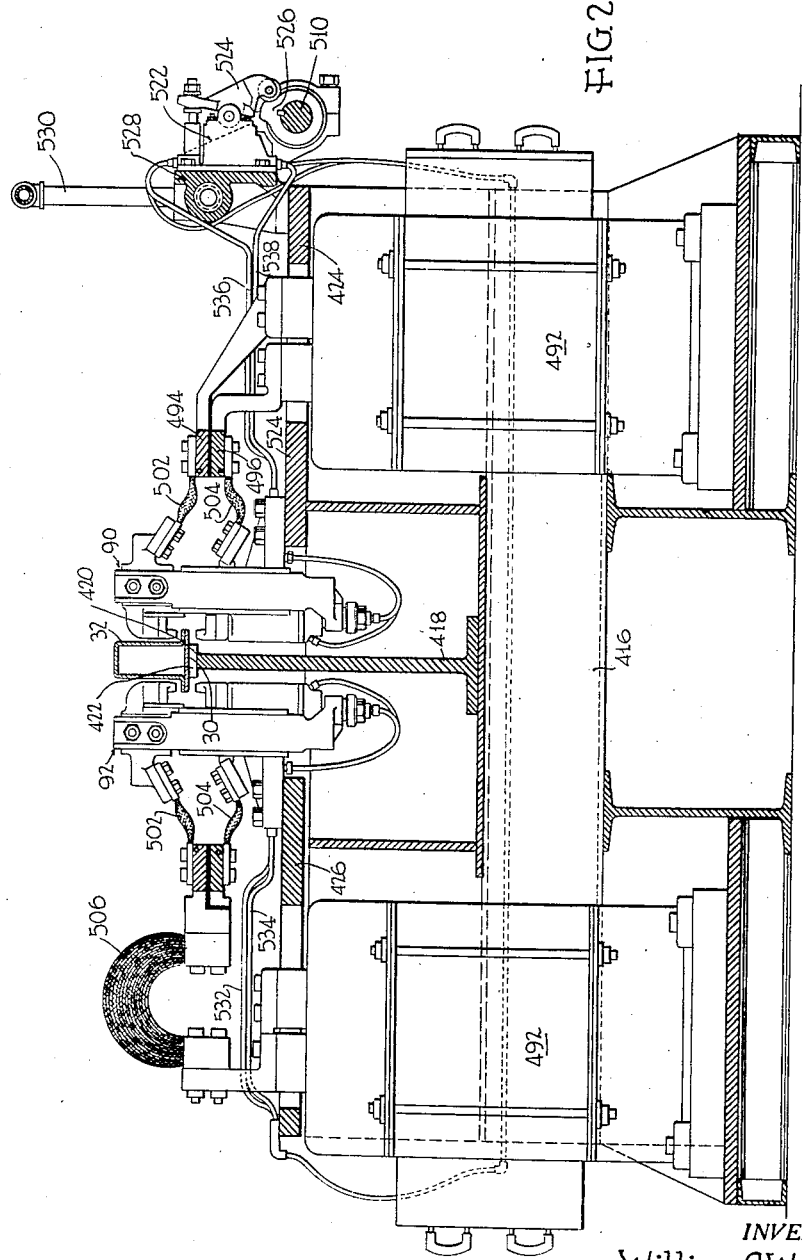

May 11, 1943. W. A. WEIGHTMAN 2,319,095
PRESS WELDING MACHINE
Filed Aug. 25, 1939 12 Sheets-Sheet 11
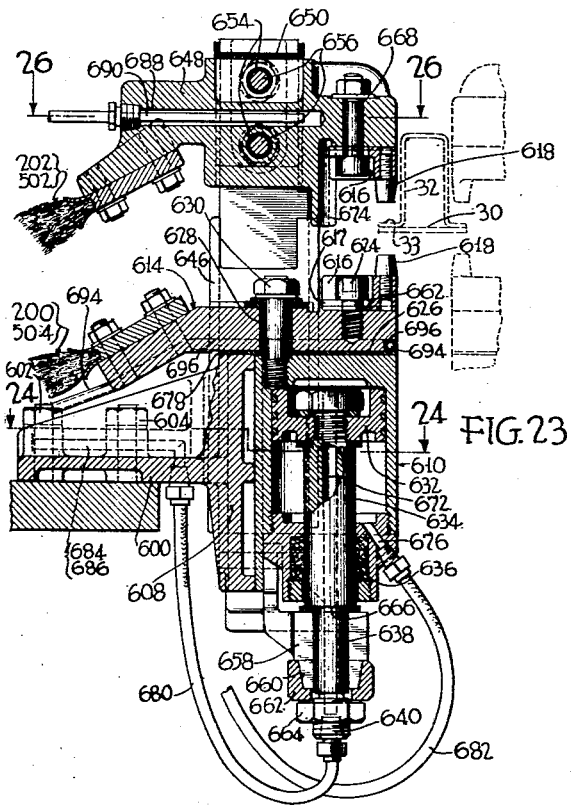
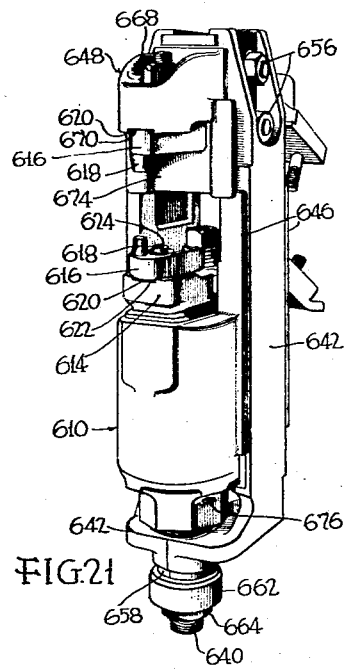
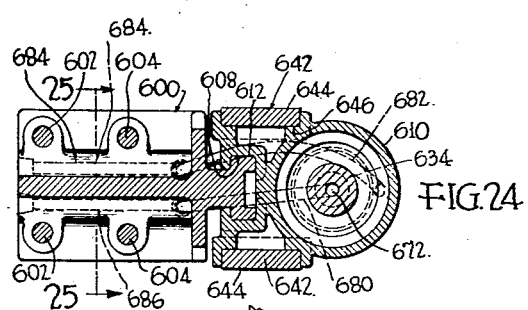
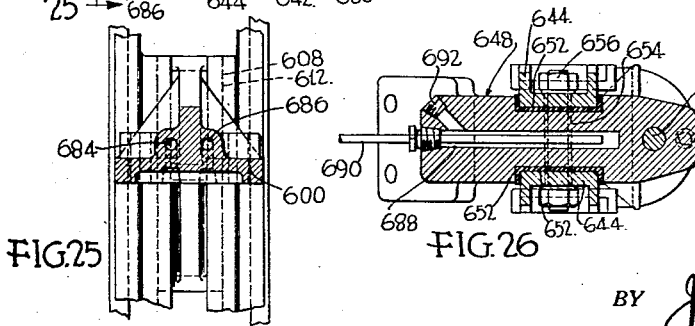
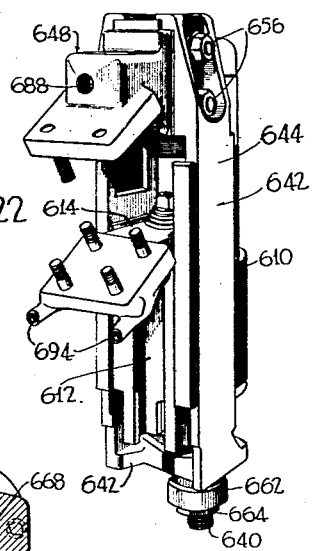
INVENTOR
William A. Weightman
BY John P. Tarbox
ATTORNEY

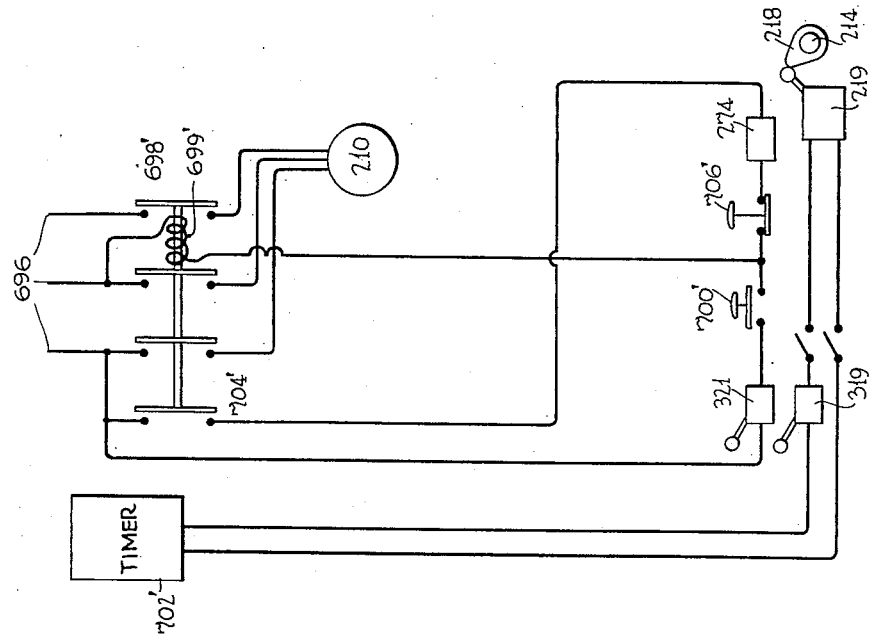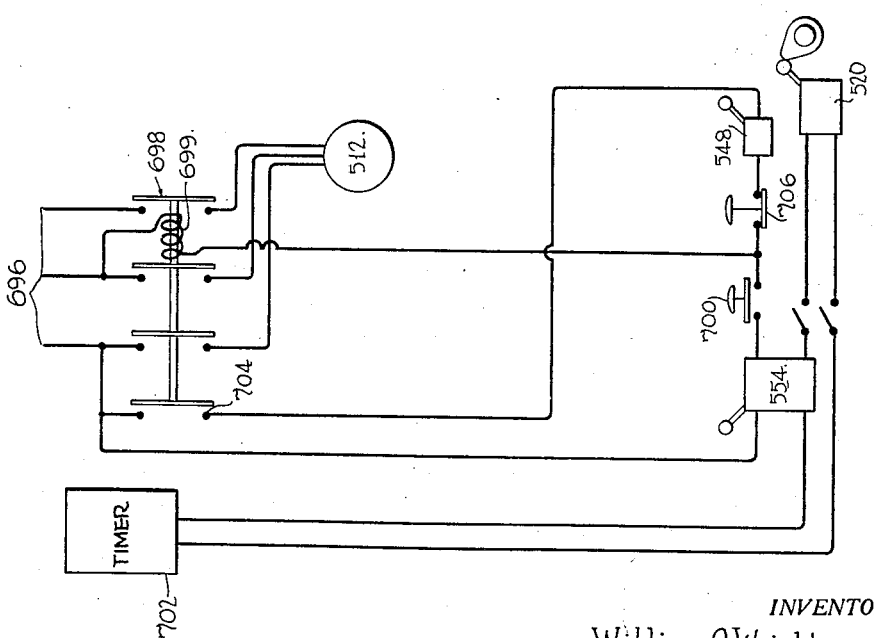

Patented May 11, 1943

2,319,095

UNITED STATES PATENT OFFICE 2,319,095

PRESS WELDING MACHINE

William A. Weightman, Philadelphia, Pa., assignor to Edward G. Budd Manufacturing Company, Philadelphia, Pa., a corporation of Pennsylvania Application August 25, 1939, Serial No. 291,838

15 Claims. (Cl. 219—4)

The present invention relates in general to the production of heavy sheet metal beams, for example of box section, wherein the parts are secured by a plurality of spot welds substantially uniformly spaced along the length of the beam and particularly apparatus therefor.

The invention is an improvement over the apparatus and procedure described and disclosed in the copending application Serial No. 143,600, filed May 19, 1937, which has now eventuated into Patent No. 2,229,993, dated January 28, 1941.

The apparatus forming the subject matter of the aforementioned application comprises a machine for the rapid production of frame members composed of a flanged channel member and a cover plate, the two being secured together by a plurality of closely spaced spot welds between the flanges and the cover plate along the length thereof. The frame member forming the particular subject matter of the disclosure is adapted for use in automotive vehicle frames and, as will be well understood in the art, such frame members are not necessarily straight and from time to time are designed with various curvatures to accommodate various elements of an automotive vehicle which support the frame or which the frame supports. With the acceptance of such frame members for use in the automotive field as above described, increased thickness of the members forming a part thereof has been found desirable for use in heavier vehicles, requiring the use of heavier welding pressures than were heretofore capable of being obtained upon an apparatus such as disclosed in the aforementioned application. Since the motive power for obtaining the welding pressure is derived from fluid pressure through the use of cylinders and pistons, either an increase in pressure of the fluid would be necessary to increase the welding pressure, or else an increase in cylinder diameter would be required. The extent to which pressures may be increased may be limited by various mechanical considerations. The increase in the diameter of cylinders where a plurality are closely spaced to effect a plurality of welds results in an increase in spacing of those welds. Further, where the curvature of the member in which welds are to be effected is considerable and the welds are made with the axis normal to the curvatures, the presence of welding tools or cylinders radially inward of the curvature causes considerable crowding of the welding tools and results in increased spacing between welds.

Considering these factors, the curvature of the beam, the requirement that the curvature of the beam be changed from time to time, and desirability of increased welding pressures, it is an object of the present invention to provide an apparatus for effecting a line of closely spaced spot welds, which apparatus may be flexible in that it can be changed without great difficulty to accommodate changes in curvature in the line.

Another object of the invention is to provide an apparatus of the type described employing air pressure to establish the welding electrode pressures and in which the welding electrode pressure may be of the order of 1600 pounds.

Another object of the invention is to provide a machine which may readily accommodate and effect welds in various thicknesses of metal up to and including those thicknesses requiring high welding tip pressures.

Still another object of the invention is to provide an apparatus capable of forming a plurality of spot welds closely spaced on a curved member where the axis of the spot welds is normal to the curvature.

Yet another object of the invention is to provide an apparatus of the type described which is substantially automatic in its operation and which may effect as many as several hundred welds in as little time as ten seconds.

A still further object of the invention is to provide an apparatus having great accessibility for adjustment, replacement of parts liable to wear as well as for loading and unloading.

A still further object of the invention is to provide in such an apparatus a double-acting floating welding gun capable of effecting contact with the work with uniform pressure on each side and separating from the work after the weld is completed all in the fraction of a second.

Still another object of the invention is to provide an apparatus for effecting a plurality of closely spaced welds upon a reversely curved workpiece normal to the curvature thereof, which apparatus is composed of a plurality of stages for effecting welds at a greater spacing in each stage but substantially intermediate the welds of the other stages.

The above and other novel features of the invention will appear more fully hereinafter from the following detailed description when taken in connection with the accompanying drawings. It is expressly understood, however, that the drawings are employed for purposes of illustration only and are not designed as a definition of the limits of the invention, reference being had for this purpose to the appended claims.

In the drawings wherein similar reference characters refer to similar parts throughout the several views:

Figure 1 is a side elevation of a part of the apparatus termed a press welder and is illustrated in pressed welding position.

Figure 2 is a longitudinal section through the press welder of Figure 1 substantially through the center thereof, the press welder being shown in separated position.

Figure 3 is a section taken on the line 3—3 of Figure 2 showing the detail of the press ram.

Figure 4 is a section taken on the line 4—4 of Figure 1 showing the detail of the press ram.

Figure 5 is a section taken on the line 5—5 of Figure 1 showing the detail of the press ram.

Figure 6 is a section taken on the line 6—6 of Figure 1 showing the detail of the table and the support for the welding guns.

Figure 7 is an enlarged fragmental end elevation of the apparatus of Figure 1 illustrating in detail the operating cam mechanism.

Figure 8 is a section taken on the line 8—8 of Figure 7.

Figure 9 is an end elevation of Figure 7.

Figure 10 is a diagrammatic illustration showing the arrangement of the welding guns upon a workpiece and the position of the welds to be effected thereon at different stages.

Figure 11 illustrates diagrammatically a series of stages for effecting a complete set of welds as illustrated in Figure 10.

Figure 12 is a top plan view of a re-welder adapted for use in any one of the second, third or fourth stages of Figure 11.

Figure 13 is a side elevation of the re-welder of Figure 12.

Figure 14 is another side elevation of Figure 12 illustrating the cam operating mechanism.

Figure 15 is a section taken through the re-welder of Figures 12, 13 and 14 showing the same in loading position.

Figure 16 is a similar section as Figure 15 showing the apparatus in loaded position ready for welding.

Figure 17 is an enlarged section taken on the line 17—17 of Figure 13 illustrating the detail of the table supporting the welding electrodes.

Figure 18 is a section taken on the line 18—18 of Figure 13 showing further details of the mechanism of Figure 17.

Figure 20 is a section taken on the line 20—20 of Figure 12 showing the arrangement and detail of the welding guns, transformers and welding current connections.

Figure 21 is a front and side perspective view of an individual sliding or floating welding gun.

Figure 22 is a rear and side perspective view of a welding gun.

Figure 23 is a longitudinal section through a welding gun.

Figure 24 is a section taken on the line 24—24 of Figure 23 illustrating a cylinder, bracket and sliding guides.

Figure 25 is a section taken on the line 25—25 of Fig. 24 and illustrating in elevation the sliding guides.

Figure 26 is a section taken on the line 26—26 of Figure 23 and illustrates the upper electrode support and cooling therefor, and Figures 27 and 28 are wiring diagrams of the control circuit.

Figure 19:
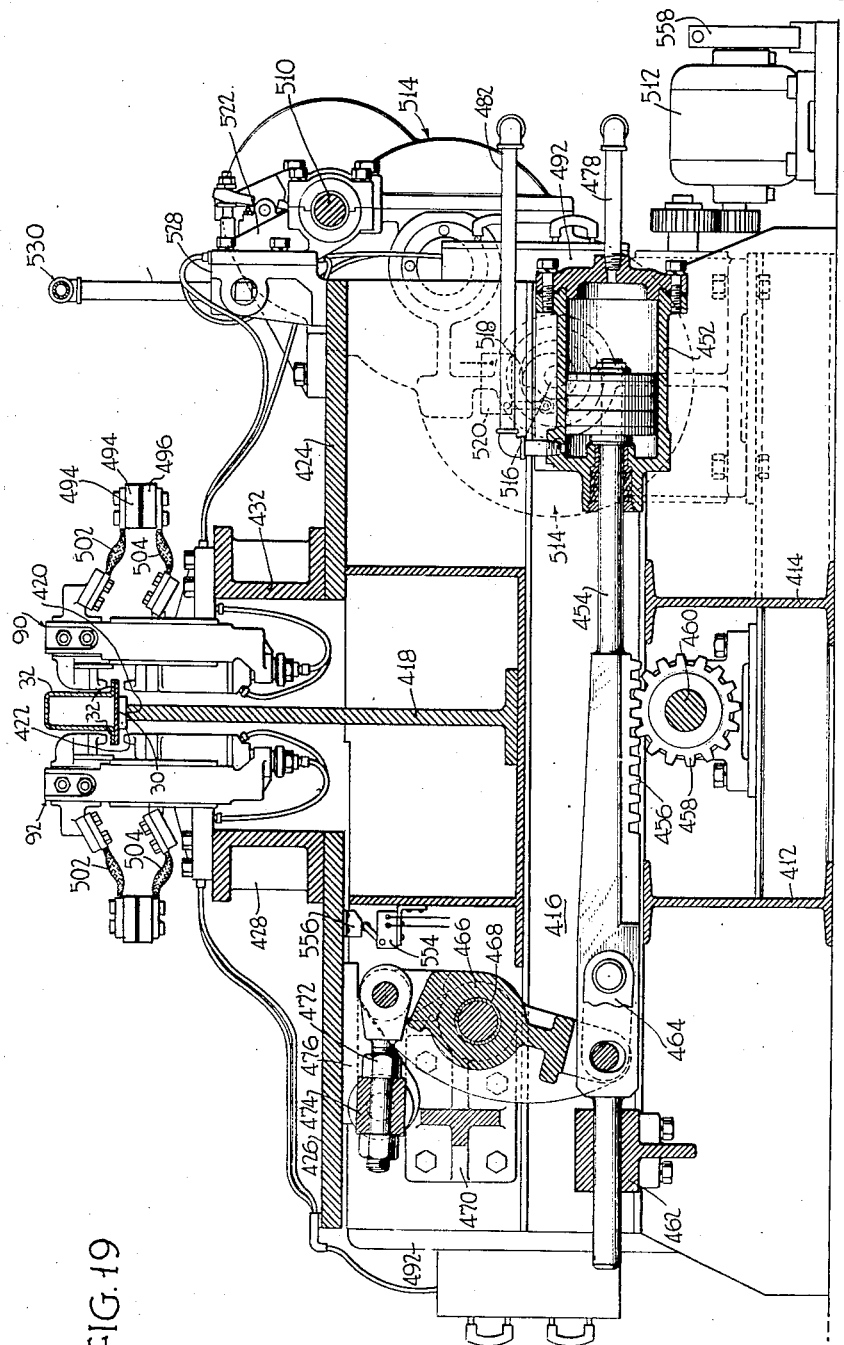
Figure 19 is a section taken on the line 19—19 of Figure 12, and illustrating in detail the table moving mechanism.

Referring to the drawings and more particularly Figures 1 and 2 thereof, there will be seen a press welding machine adapted to secure a cover plate or cap strip 30 on a flanged channel member 32, the sectional details of which will readily appear in Figures 3, 4 and 5. The machine is composed of a frame-work having uprights 34 and 36 and a transverse top member 38. Slidably positioned between the uprights 34 and 36 and underneath the top member 38 is a press ram 40 adapted to slide on ways 42 and 44 and adapted to be lifted and lowered by a cylinder 46 in the top member and a piston 48 on the rod 50 connected to the press ram.

In order that considerable pressure in addition to the weight of the press ram may be applied to the workpieces, the top member is held to a base member 52 through heavy tie rods 54 and 56 extending through the uprights as is illustrated in Figures 1 and 2.

For the purpose of supporting the channel member 32 in the bottom portion of the machine there is provided on the base member a plurality of support members 58, each having a U-shaped notch 60 in the end thereof adapted to receive the channel member 32, as illustrated more in detail in Figures 3, 4 and 5. The support members are secured in their various positions by a plate 62 lying on the base member 52 and tie members 64 extending in between adjacent support members 58. The U-shaped openings are provided with hardened angular cheeks 66 for supporting the channel member adjacent the flanges thereof and the space between the cheeks is so arranged as to closely fit and engage the channel member workpiece. The workpiece is located longitudinally by a hardened abutment 67 located upon the side member 34 of the frame of the machine as illustrated in Figure 2.

As illustrated in Figure 2 the press ram 40 is composed of a main portion having dies 68 and 70 rigidly secured thereto and a central vertically sliding portion 72 having a die 74. To facilitate loading of the machine the central die 74 is provided with two pairs of spring pressed latches 76 which are adapted to catch and hold a cap strip against the die prior to operation of the press ram. To assure proper location of the cap strip with reference to this die, the cap strip is provided with a pair of holes which in loading upon the die 74 must be aligned with pins 78 carried by the die. In loading it will readily appear that the cam surfaces 80 of the latch members 76 are so contoured as to readily cause the latches to open to receive the cap strip as the cap strip is pressed toward engagement with the central die. The central slidable portion of the ram is carried in the main portion of the ram on guides 82, 83 and its movement is limited by a transverse bar 84 extending through the main ram portion and through a slot 86 in the central slidable ram portion. When the press ram is lowered, it will, therefore, appear that the central portion of the ram engages the cap strip with the channel member first and thereafter the remainder of the ram and its dies 68 and 70 forms the cap strip 30 upon the extremities of the channel member 32. When the ram is moved to full pressure position as is illustrated in Figure 1, the central portion of the ram first takes the position shown in Figure 4 while the main portion of the ram is still in the position shown in the dotted lines. Further lowering of the ram brings the remainder or main portion of the ram to the position shown in Figure 4 and, as is also shown in Figure 5. The dies 74, 70 and 68 are thus brought into alignment to form the cap strip around the channel member and to hold the same in such position while a number of spot welds are effected. In order that sufficient clearance for the pairs of welding electrodes be left, the cheek portions 66 are arranged in between the welding electrodes and are adapted to align with similar hardened spaced blocks 89 arranged along the length and lower face of the dies 68, 70 and 74. Alignment of the dies 74, 70 and 68 is assured by the engagement of the cross bar 84 with the lower limit 87 of the slot 86 in the central slidable portion of the ram. When the ram is in lowered or press position, it will be observed in Figure 4 that the latch members 76 are opened by reason of their engagement with the flanges 33 of the channel member 32, the latches being so arranged upon the die 74 as to not reach beyond the channel flange. Thus, when the press ram is raised, the latches ride over the cap strip leaving the channel and cap strip in the slots 60 of the support plates 58.

Referring to Figure 6 wherein a transverse enlarged section through the lower portion of the machine is illustrated, there will appear a pair of welding guns 90 and 92 with their welding electrodes arranged in position for effecting a weld between the flange 33 of the channel member 32 and the cap strip 30. It will appear that the welding electrodes so positioned would interfere with the loading of the channel member 32 in its support as well as the lowering of the ram 40 carrying the cap strip 30 thereon. To overcome this interference, the welding guns 90 and 92 are supported on laterally movable tables 94 and 96 so that upon loading and unloading of the machine the welding guns can be moved laterally out of the way of the workpiece. As is shown in Figure 1, the table 96 carries a series of welding guns 90 which are secured to the table through a series of shaped support blocks 98, 100 and 102, each of which support blocks have a flat bottom face 104 for engaging the table and a contoured upper face 106 for securing the welding guns thereto in a proper position for operation upon the varying curvature of the channel and cap strip workpiece members. All the welding guns on the one side of the machine are, therefore, carried upon one of the table members 94 and 96 and those on the other side of the machine are carried on the other.

To support the tables for lateral movement a plurality of spaced rollers and guide members are provided as at 108. Each consists of top and bottom grooved guide rails 110 and 112, which, as is shown in Figure 18, are held together centrally by a block 114 which separates each of the guide rails in two parts. Rollers 116 carried in brackets 118 secured to the tables 94 and 96 are adapted to run upon the rails 110 and 112, the spacing in the rails being such that only sufficient clearance is provided to prevent a roller from contacting both rails at the same time.

The detailed construction of the block and guides may be gathered from Figures 17 and 18 hereinafter referred to more in detail wherein similar rollers and guides are provided in reverse arrangement.

To move the tables laterally into and out of operative position fluid pressure cylinders arranged in the base and acting on levers are employed. In Figure 6 this mechanism is illustrated in some detail and there is shown there a cylinder 120 having a piston 122 and piston rod 124, the latter being slidably supported in a guide 126. The piston rod is connected to lever 130 through a pair of links 132 pivoted to the piston rod 124 at 134 and to the lever 130 at 136. The levers 130 are fulcrumed at 138 in journals 140 composed of spaced plates 142 and 146 adapted to be secured to the vertical transverse frame members 148 and 150. The spaced plates 142 and 146 have integral journal bosses 152 and 156 for receiving the pivot pin 158 of the lever. Each lever is composed of spaced plates 160 and 162 secured together by a web 164 and the upper ends of the lever are connected to the tables 94 and 96 through an adjustable link 170 pivoted to the lever on pins 172 and to the table through a trunnion 174 and depending table bracket 176. The adjustable link 170 is provided with adjustment nuts 178 and 179 between which the trunnion block 174 is adjustably clamped so that the table adjustment is facilitated. To move each table a cylinder is preferably employed at each end as is illustrated in Figures 1 and 2 and in order to assure lateral movement of the table, means are provided for synchronizing the movement of the two cylinders associated with each table. For this purpose each piston rod is provided with a rack 180 which is adapted to engage and mesh with a pinion 182 carried on a shaft 184 which extends along the length of the machine to a similar pinion and rack associated with the other cylinder. As shown in Figure 2, to accommodate such a mechanism for both pairs of cylinders and both tables, a concentric tubular shaft 186 is provided around the shaft 184 and carries thereon at either end pinions 188 and 189 adapted to engage and mesh with racks associated with the pistons of the cylinders adapted for operating the other table.

On each table, as has previously been described, are arranged blocks 98, 100 and 102 having an upper contour 106 corresponding to some extent with the shape of the frame member or workpiece and welding guns are secured to these blocks in proper position for effecting the necessary welds. Also carried on each table are a pair of bus bars 190 and 192 supported on brackets 194, which bus bars are connected to stationary transformer leads 195 and 196 through flexible conductors 198. Since the welding guns themselves, 90 and 92, are of the floating variety as will hereinafter be described, they are connected to the bus bars 190 and 192 through flexible conductors 200 and 202. The bus bars 190 and 192 are arranged in four different sections along the length of the machine and for each section a transformer is provided. The arrangement of the transformers in the frame is shown in Figures 1, 2 and 6 particularly and are indicated by the reference character 204.

Associated with each section of bus bar is a group of welding guns six in number which are adapted to engage the work and effect a weld in rapid succession. During the engagement of the work by one gun the remaining five guns are out of engagement with the work so that upon energizing the welding transformer for that particular group and the bus bars, welding current will flow to only the one gun in engagement with the work. The apparatus in practice is adapted to effect a weld in the interval of one second and each gun, assuming a sixty cycle alternating current is employed, is adapted to engage the work in ten cycles, to be energized with a welding current for a period of fifteen to twenty cycles, during which period the bus bars are energized from the welding transformer, and thereafter the welding electrodes dwell in their position under pressure for approximately fifteen cycles before parting from the work.

To effect this operation a Geneva and cam operated valve mechanism is provided to supply the welding guns with air pressure for causing the electrodes to engage the work and separate therefrom. For this purpose an electric motor 210 is provided in conjunction with a gear box 212 having a timer shaft 214 driving through a Geneva movement, a valve operating shaft 216. This valve operating shaft 216 extends through the length of the machine and drives through gears 220 and 222 (see Fig. 7) and bevel gears 224 and 226 pairs of cam shafts 228, 230, 232 and 234 located on each end of the machine, a total of four cam shafts in number. The speed of the motor 210 and the Geneva movement is such as to drive the cam shafts 228—234 at the rate of one revolution in ten seconds and in ten separate equal steps. The Geneva movement is such as to drive the cam shafts 228—234 one-tenth of a revolution at a time in the space of a quarter of a second and the shafts remain idle during the intervening three-quarters of a second period. The timer shaft 214, Fig. 6, carries a cam 218 which is adapted to operate through a welding timer, control switch 219 to effect the energization of all the welding transformers 204 at the same time. The Geneva movement which drives the shaft 216 and the cam shafts 228 to 234 may be of any preferred form, one example of which is illustrated in the copending application hereinabove referred to.

Each of the cam shafts 228 to 234 is provided with six valve operating cams 236 spaced along the length of the shaft and with the cams arranged at angles of 36 degrees from one another, and when each shaft is in a rest position as results from the stationary interval provided by the Geneva movement, a cam engages one of the valve followers 238 to effect engagement of a welding gun and its electrodes with the work. For each pair of welding guns on opposite sides of the workpiece a single valve is provided and thus since there are six pairs of welding guns in each section, six valves and six cams are required to operate the guns of any one section. For this reason the cam shafts 228—234 are four in number so as to provide a separate cam shaft for controlling the guns of the four sections.

Referring to Figures 7, 8 and 9, it will appear that the cam shafts 228 and 230 are geared together as at 241, and are supported from the uprights 34 and 36 of the main frame of the machine and journaled in bearings 242, one carried upon a combined air manifold and bracket member 244, supported on a channel member 246 directly secured to the uprights and the other being located in the gear box housing 243. Also carried upon the air manifold and bracket members 244 are the valves 240 which, as is illustrated in Figure 7, are adapted to be secured upon the face 248 of the bracket 244 and each valve is adapted to cover and connect with ports 250 appearing in the face 248 and connecting with a longitudinal bore 252 extending through the bracket 244, the ports 250 and the bore 252 constituting a manifold for supplying compressed air to the valves 240. The manifolds are connected to a compressed air line through pipes 254 as is illustrated in Figure 7.

In order to provide the rapid engagement of the welding electrodes with the work as well as rapid separation therefrom after welding, each welding gun is provided with a double acting cylinder and piston as is illustrated more in detail in Figure 23, and each valve 240 is adapted when actuated by its associated cam 236 to admit compressed air into the associated pair of welding gun cylinders to effect engagement of the welding electrodes with the work and at the same time to connect the opposite end of the cylinder to exhaust. Additionally, each valve when not actuated by its associated cam 236 is adapted to supply the opposite end of the cylinder with compressed air to effect immediate separation of the electrodes and at the same time to connect the other end of the cylinder to exhaust. Any suitable valve may be provided for this purpose as will be well understood in the art and the details thereof are not illustrated for they form no part by themselves of the present invention. In the form of valve shown as will appear in Figure 8 at 240, the rocker shaft or cam follower 238 is adapted to actuate the valve operating pins 256 and 258 to effect the functioning of the valve as has hereinabove been described and the cam follower is caused to maintain its engagement with its associated cam 236 by a spring return 260. Each valve is provided with its individual exhaust 262 and is connected to its associated pair of welding electrodes through pipes 264 and 266 which connect to the pairs of cylinders as will be hereinafter described more in detail in connection with the structure of the welding guns.

It will appear from the above that six-tenths of the revolution of each cam shaft is employed for operating the various valves and welding guns leaving four-tenths of the revolution for control function. For this purpose the cam shaft 228 is extended beyond the bearing 242 as is illustrated at 268 and is provided with a pair of cams 270 and 272 which are adapted to automatically control the operation of the machine subsequent to the formation of all the welds. The cam 270 for example actuates a switch 274 through the cam follower 276, which switch interrupts the motor driving the Geneva movement and valve operating cam shafts. Also upon interrupting the motor circuit the brake 211 is applied. The cam 272 acts prior to cam 270, and through a follower 278 operates a valve 280 to automatically cause the movable tables and the ram to open up the machine for removal of the workpiece after all welds have been completed.

For an undertanding of the control exercised by the valve 280 over the operation of the machine, the control mechanism will now be described. As has previously been set forth, the ram operating cylinder and piston are operated by fluid pressure derived from a pump 282 which delivers preferably oil under pressure through a check valve 284 to a control valve 286. The control valve is adapted to connect the source of fluid pressure to either the top or the bottom of the cylinder through pipe lines 288 and 290, respectively, and at the same time connect the pipe line 290 or 288, respectively, to the discharge pipe line 292 which is connected to the reservoirs 294 and from which reservoirs the pump 282 receives its fluid through pipes 296.

To actuate the ram through the cylinder and piston 46 and 48, a manual lever 298 is provided in an accessible position upon the frame upright 36, which lever is connected to the valve 286 through links 300 and 302 and bell crank 304. Thus by manually operating the valve 286 to the position shown in full lines, fluid pressure will flow from the pump into the top of the cylinder 46 forcing the piston 48 downward and discharging the fluid from the bottom of the cylinder through the valve 286 into the reservoirs 294. By employing a suitable restriction in line 290 the rate at which the ram lowers may be regulated and after being lowered into position considerable pressure may be applied thereto by the pressure of the fluid in the cylinder on the top side of the piston 48. When the ram is lifted by actuation of the valve 286 to a position to the left of that shown, fluid pressure is admitted to the lower side of the piston 48 and the ram thereby raised. If the valve is left in this position, the ram is prevented from lowering by reason of the check valve 284 which prevents liquid from escaping from the lower part of the cylinder through the valve 286 through the pump 282 which might, for some reason, be stopped and otherwise in the absence of the check valve 284 permit leakage of the fluid back into the reservoir 294 and allow the ram to drop.

As the ram lowers, it is desirable to effect lateral movement of the tables 94 and 96 as the ram completes its downward movement, and for this purpose a toggle cam 306 is provided on the ram as illustrated in Figure 1 and which cam is adapted to actuate a valve 308 carried upon the guide 44 on the upright 36. The valve 308 is connected to a valve operating cylinder 309 for the manually operable valve 310, which latter valve is adapted to distribute air pressure to either end of the table, moving cylinders 120 to effect lateral movement of the tables in one direction or the other. Thus, upon operation of the valve 308, the valve 310 is actuated to supply fluid pressure to the inner ends of the cylinders 120 through the pipe line 312, thereby effecting movement of the tables toward one another and positioning the guns 90 and 92 in proper relation to the workpiece to be welded.

As the table 94 moves to its inner limit, the cam operated switch 321 is closed (see Fig. 6) to start the motor 210, and the valve operating cam shaft.

Also as the ram approaches its lower limit the switch 319 (see Fig. 1) is actuated, to close the circuit to the welding timer, and without which closure, all welding current is cut off and when the ram lifts, such switch is again opened, thereby cutting off all welding current from the timer.

Upon completion of the welds to be effected as has been described in conjunction with the cam shafts illustrated in Figure 7, the valve 280 is operated by the cam 272 on the extension 268 on the cam shaft 228. Through a second valve operating cylinder 311 associated with the manual operable valve 310 and connected to valve 280 through pipe 315, the valve 310 is actuated to its other position to cause fluid pressure to flow to the outer ends of the table operating cylinders 120 through the pipe line 313, thus causing the tables to separate and clear the workpiece. To effect simultaneous lifting of the ram with the spreading of the tables 94 and 96, a cylinder and piston 314 is provided in conjunction with the manually operable lever 298 to automatically effect shifting of the valve 286 which controls the ram lifting and lowering cylinder 46 and the control cylinder 314 is connected with the valve 280 through the pipe line 317 for operation simultaneously with the valve 310.

In order to remove the workpiece from the machine upon the raising of the ram, there is provided a pair of upright ejecting cylinders 320 carried in the base of the frame of the machine, which cylinders have piston driven ejecting pins 322 adapted to reciprocate through guides 324 in the workpiece support structure and engage the workpiece to lift the same out of the U-shaped supporting members 58. Since the U-shaped supporting members are adapted to form the channel member to the correct box section upon the lowering of the ram, at which time the channel member is forced to seat in the guide members 58, considerable friction may be present between the channel member and the guide support members thereby necessitating the forceful ejection of the channel member after completion of the welds. A suitable foot operated valve 326, as illustrated in Figure 1, is connected to the ejecting cylinders 320 through the pipe line 328 and in practice the operator may actuate the valve 326 after the ram raises or just prior thereto, and in the latter case it will be understood that the channel member is thereby ejected simultaneously with the raising of the ram.

Because of the heavy thickness of the parts to be welded, and to supply sufficient welding pressure at the guns to assure substantial and uniform welds, the size of each welding gun is so great as to preclude the arrangement of sufficient welding guns upon a single machine to effect all the welds at one time. Referring to Figure 10 in which this difficulty is illustrated, there will appear three welding guns 90 having substantially the spacing required in mounting the same upon the movable tables 96 and 98. In order to obtain welds as closely spaced as an inch or an inch and three-eighths and to obtain sufficient pressure as has been heretofore set forth, the welding guns must have a distance between centers of roughly from four to five and one-half inches and, as shown in Figure 10, with such a spacing, the width of an individual gun may be approximately two and three-fourths or three inches and thus the guns may have sufficient clearance between one another so as not to interfere with one another where it is necessary to arrange the guns for operation in conjunction with a curved portion of the channel member such as indicated by the reference numeral 330 in Figure 1. Thus to effect the full number of welds upon a given member where the spacing between welds is less than that permissible by the welding guns, re-welders are employed to effect the remaining intermediate welds. For example, in Figure 10 the welding guns 90 may be three adjacent guns such as are arranged upon the press welder of Figure 1 and the guns are adapted to effect welds 332, 334, 336, etc. and the welds upon the opposite side of the channel member, 333, 335, etc. are effected by similar guns which are arranged in pairs upon the other side of the channel as has been clearly illustrated and described in conjunction with Figure 6. The intermediate welds such as 338, 340, etc. may be effected in the second stage of welding in a re-welder and the other intermediate welds 342, 346, 348, etc. may be effected in a third stage in a second re-welder and the welds 350, 352, etc. may be effected in a fourth stage and a third re-welder. It will be understood that the welds upon the opposite side of the channel member may be formed at the same time by pairing the guns as has been described in conjunction with the press welder and as particularly shown in Figure 6. In Figure 11 there has been diagrammatically illustrated a suitable arrangement for a press welder and re-welders for effecting all the welds in four stages. Referring to Figure 11, the press welder is illustrated at 354 and the first stage of re-welding is illustrated at 356 and the second and third stages illustrated at 358 and 360, respectively. It will be observed from Figure 11 that the channel member may have a lateral bend as illustrated at 362 as well as vertical curvature as has been referred to in conjunction with the press welder hereinbefore described. To facilitate the handling of the workpiece in the re-welders 356, 358 and 360 and for other reasons which will hereinafter appear, the workpiece is inverted after leaving the press welder. Thus the lateral bend or offset in the frame member appears reversed in the diagrammatic showing of the re-welders 356, 358 and 360. It will be obvious that in making frame members for automotive vehicles where such a lateral offset is required two sets of press welders and re-welders will be necessary in order to handle the right and left-hand workpieces or frame members but for simplifying the disclosure herein but a single series of stages will be described for producing one of the frame members only.

Referring to Figures 12 through 20, there is illustrated in detail a re-welder adapted for use in any one of the three stages following the press welder stage. In some respects the re-welder is quite similar to the press welder but since there is no forming of the cap strip to be effected and since the channel member and cap piece arrive at the re-welder secured together by a plurality of welds although widely spaced, the press features including the ram are not present. As illustrated in Figures 13 and 14, each re-welder has a frame composed of spaced uprights 400, 402, 404, 406, 408 and 410 tied together by longitudinally extending frame members 412 and 414 and transverse members such as 416. Extending centrally through the length of the machine is a work support member 418 consisting of a thin upstanding plate provided with a top edge 420 having spaced cleats 422. The top edge 420 has a contour complemental to the shape of the beam or workpiece to be supported thereby and also has such a lateral offset as is necessary to align the same with the lateral offset (as referred to in connection with Fig. 11) of the workpiece. As illustrated in Figure 12, a plurality of pairs of welding guns 90 and 92 are spacedly arranged along the length of the apparatus and in a position adjacent the workpiece to effect such welds as may be desired in the particular stage. The welding guns are identical to those employed in the press welder previously and hereinabove described and the details thereof will appear hereinafter.

The welding guns are arranged on tables 424, and 426 and such spacing blocks as 428, 430, 432 and 434 as may be necessary to support the guns in proper relation to the contour of the frame member or workpiece to be accommodated. The table 424 may be rigid with the machine as distinguished from the tables 96 and 98 of the press welder but the table 426 is laterally movable to permit placing the workpiece within and removing the workpiece from the machine. The necessity for moving but one table in the present instance arises from the fact that no pressing operation of the parts occurs in re-welding and therefore it is not necessary that the workpiece be inserted by a pure vertical movement but may be inserted by a vertical movement and then laterally slid into place. Thus the movable table 426 may be moved through a distance proportionately greater or a distance equivalent to the movement of both tables in the press welder. This feature is illustrated in Figures 15 and 16 wherein the relative positions of the tables and their welding guns and the work support 418 and the workpiece are illustrated both in the welding position and in the loading and unloading position.

The movable table 426 is provided with opposed spaced roller guides 436 and 438 (Figs. 17 and 18) at four spaced points along the table, the guides being secured in spaced relation by an interposed central block 440. Rollers 442 and 444 adapted to roll in the guides 436 and 438 are carried in roller bearing blocks 446 secured to the frame members 416 and associated frame plates 448. The bearing blocks may have a pin or bolt intermediate the roller bearings extending through a slot 450 in the guide block between the guides 436 and 438, the slot being particularly arranged to limit the lateral movement of the table in either direction. It will also be observed that the rollers have a diameter substantially that of the distance between the spaced parallel guides but that just sufficient clearance is provided so that either roller will engage only one of the guides at any one time and thus avoid any interference.

Lateral movement of the table is effected by a pair of cylinders and pistons 452 as shown in Figures 14 and 19. Each cylinder and piston has a piston rod 454 and is geared to the other piston rod through racks 456 and pinions 458 fixed to the ends of a shaft 460 extending longitudinally of the machine from one rack to the other. Each piston rod 454 at its extreme end extends into a fixed guide 462 and through a pair of links 464 acts upon a short table operating lever 466 fulcrumed at 468 in a bearing bracket 470. The lever 466 is connected by an adjustable link 472 to a pivoted block 474 carried in a depending bracket 476 secured to the movable table 426. To move the table to operative position air pressure is admitted to the right-hand end of the cylinders 452 through a pipe line 478 leading to a manually operable valve 480 (Fig. 14) and to separate the table air pressure is admitted to the left-hand side of the cylinder (Figure 19) through pipe line 482 also leading to the manual valve 480.

To rigidly secure the workpiece in proper lateral position after resting the same upon the support member 418 and its transverse cleats 422, the table 424 is provided with a plurality of spaced arms 484 (see Figs. 15 and 16) having projections 486 adapted to engage the top side of one of the flanges of the channel of the workpiece. The movable table 426 is provided with similar arms 488 with projections 490 adapted to engage the upper side of the other flange of the channel of the workpiece. Thus as is illustrated in Figures 15 and 16 upon the movement of the table 426 towards table 424 the projections 490 and 486 approach the workpiece and securely position and hold the same during the subsequent welding operations.

To effect the welds, the welding guns 90 and 92 are arranged in five sections, each section including up to seven pairs of guns and as illustrated in Figure 12, the sections of the guns on either side of the machine have common bus bars and common transformers. As appears in Figures 13 and 14, each side of the machine is provided with five welding transformers 492, each of which is connected to a pair of bus bars 494 and 496 one above the other as is illustrated in Figure 19. The transformer connections to the bus bars are staggered, that is the connection to the upper bus bar 494 for example is by a lead 498 (see Figure 12) extending to the left-hand end of the bus bar 494 while the other transformer lead 500 extends to the right-hand end of the lower bus bar 496. Thus by reason of the flexible connections 502 and 504 to the various welding guns from the bus bars 496 and 494 and the staggered connections the path of current travel from the transformer to any one welding gun is maintained substantially constant. The bus bars 494 and 496 are secured to their respective adjacent tables and those on the left-hand side of the machine (see Figure 20) are carried with the table in its movement but are connected to its transformers through flexible leads 506 and 508.

In order to cause successive engagement of the various welding guns in the various groups, fluid pressure is employed controlled by cam operated valves driven by a shaft having a step by step movement extending along the length of the machine. Such apparatus is illustrated in Figures 12, 14, 19 and 20. As illustrated in Figure 19, the valve operating cam shaft is indicated by the reference character 510 and is driven from a motor 512 through a gear box 514 containing a Geneva movement, having substantially the same characteristics as that hereinabove described in connection with the press welder. The gear box is provided with a shaft 516 adapted to rotate at the rate of one revolution per second and carries a welding timer control in the form of cam and switch 518 and 520, respectively. Through the Geneva movement which is located in the gear train between the shaft 516 and the valve operating cam shaft 510 the shaft 510 is caused to rotate in steps of 36 degrees in substantially a quarter of one second and to remain stationary for the remainder of each second and to thereby make a complete revolution in ten seconds. Adjacent the valve operating cam shaft 510 is a plurality of groups of valves, five groups in all and each group of which contains seven valves 522, each having cam followers 524 adapted to engage associated cams 526 located along the length of the cam shaft 510. The cams are angularly located with respect to one another by an angle of 36 degrees and the effective portion of the cam is adapted to lift the rocker arm 524 and lower the same during 36 degrees of revolution of the shaft or less. Each group of valves is mounted upon a manifold bracket 528 secured upon the table 524 and each manifold has a connection with each valve mounted thereupon and all manifolds are connected through a pipe line 530 to a common source of fluid pressure. The valves 522 and the rockers 524 and other details thereof are substantially identical to the valves 240 appearing in Figure 8 in conjunction with the press welder. In Figure 12 some of the valves have been removed or partially removed in two of the groups in order to illustrate their position with respect to the cam shaft 510. Each of the valves, as has previously been described, is connected to a pair of opposed welding guns through connections as diagrammatically illustrated in Figure 12 by the dot-dash lines 532, 534, 536, 538 and by connections shown in full in Figure 20 bearing the same numerals. It will be understood that the pipe lines 536 and 532 for causing engagement of the welding electrodes of a pair of guns are connected in parallel to one side of the valve and are adapted to be connected to the high pressure source during such interval as the lobe of the cam raises the rocker 524 of the valve. The pipe lines 534 and 538 extend from the other side of the valve and are adapted to connect the welding guns with high pressure fluid to separate the pair of guns at such time as the rocker arm 524 is not in engagement with the lobe of its cam 526. Thus through seven successive steps of movement of the cam shaft all the pairs of welding guns may be caused to engage the work. During each step of such movement and while certain pairs of guns are in engagement with the work, one pair being located in each group, all the welding transformers are energized by the cam 518 to cause the flow of welding current to effect ten welds provided, of course, that a pair of welding guns are actuated in each group, it being understood that because of the shape of the workpiece the number of pairs of guns in any group may be less than the seven for which provision is made in the groups of valves, each group of which contains seven valves. For example, the first, second and fifth groups from left to right of Figure 12 contain six pairs of welding guns whereas the third and fourth contain seven and thus while the seventh weld is being effected, only two pairs of guns will be in engagement with the work and thus only four welds effected, although all ten transformers may be energized.

To control the operation of the machine automatically, the cam shaft 510 beyond the end bearing 540 (see Fig. 14) is provided with an extension carrying a pair of cams 542 and 544, the cam 542 operating a valve 546 and the cam 544 operating a switch 548 adapted to cut off the current to the cam shaft motor 512 after completion of all the welds. The valve 546 operating prior to the switch 548 is adapted to supply through the pipe line 550 fluid pressure to an operating cylinder 552 of the valve 480 to cause the same to actuate so as to effect lateral movement of the table 426 away from the work, or in other words, to supply fluid pressure to the left-hand end of the cylinder 452 as illustrated in Figure 19. After a new workpiece is inserted into the machine and the table 426 moved into proper welding position with respect to the workpiece by manually operating the valve 480, the table, as it reaches the end of its lateral movement, actuates a double poled switch 554 through the cam 556, which switch controls the starting of the cam shaft operating motor 512 as well as the establishing of current connections to the welding transformers. The motor 512 is provided with a brake 558 which is adapted to stop the same immediately upon the deenergization thereof.

For a detailed description of the welding guns employed reference to Figures 21 through 26 will be had. Each welding gun is supported upon a bracket 600 secured upon the table or blocks as previously described through bolts 602 and 604. The bracket is provided with a perpendicularly extending slide support or head 608 upon which is slidably supported a cylinder 610, the cylinder having integrally arranged therewith a complemental recess 612 adapted to slidably engage the support head. The cylinder at the head end thereof carries a welding electrode carrying block 614 having secured on one end thereof a welding electrode tip adaptor 616 having a welding electrode 618 threaded therein. The other end of the block 614 is provided with one end of a flexible connector such as 504 or 200 as the case may be. The welding electrode adaptor 616 is preferably provided with a central rib 620 arranged in a groove 622 in the electrode block 614 and is held in place by the screw 624 having a recess in the top thereof to receive a suitable wrench. The groove 622 in which projection 620 extends may be set at any angle in order to locate the electrode tip in a proper position and the adaptor may be slid to any desired position in the groove and thereafter tightened in place to likewise position the electrode. The electrode carrying block 614 is insulated from the cylinder by a layer of insulation 626 and insulation 628 surrounding a stud 630 by which the block is secured to the cylinder head.

The cylinder is provided with a piston 632 having a hollow piston rod 634, the same extending outwardly through the bottom of the cylinder through a stuffing box 636. The lower end of the piston rod 634 is provided with a shank 638 and a threaded extremity 640 on which are positioned two halves of the lower end of a yoke 642. The yoke comprises a pair of parallel straps 644 extending vertically in guide ways 646 arranged integrally with the cylinder structure and are bolted together at the top around an upper electrode block 648, the same, however, being separated electrically from the electrode block through insulation 650, 652 and insulation sleeves 654 upon the bolts 656. The lower ends 658 of the yoke members 642 are secured together around the shank 638 of the piston rod by engaging a tapered lower portion 660 of the lower ends of the yokes with a tapered shell 662 adapted to be forced upward by the nut 664 upon the threaded end 640 of the shank 638, the lower ends of the yokes thereby being urged upwardly into engagement with the shoulder 666 formed by the end of the main portion of the piston rod and the shank 638. The upper electrode block 648 is provided with an electrode adaptor 616 having an electrode tip 618 therein and the electrode adaptor is secured to the block by a bolt and nut 668, the block having a groove 670 for receiving the projection 620 of the electrode adaptor.

Air is admitted to the top side of the piston into the cylinder through the central bore 672 of the piston rod and causes the piston to lower in the cylinder thereby sliding the yoke 642 in the guides 646 on the cylinder and bringing the upper electrode 618 into engagement with the flange 33 of the channel member 32. Thereafter continued pressure on the top side of the piston and urging against the upper end of the cylinder forces the cylinder to raise itself sliding upon the support guide head 608 thereby bringing the lower electrode 618 into engagement with the cap strip 30. Since the pressure employed is sufficient to establish a welding pressure between the electrodes, it will be seen that, except for the weight of the parts, the pressure on the upper electrode tip and the lower electrode tip is completely equalized by the sliding movement permitted between the upper electrode and its yoke and the cylinder and its slidable support. To prevent flash or molten metal from clogging the movement of the various slide members, the upper electrode block is provided with a shield 614 which cooperates with the lower electrode when the electrodes are in engagement so as to block the path of any metal exploded away from the workpiece toward the guide 646 and the yoke 642.

To separate the electrodes fluid pressure is admitted to the underside of the piston through the port 676 in the lower end of the cylinder thereby permitting the cylinder to lower away from the workpiece until the lower welding block 614 strikes the guide head 608 at the point 678 and thereafter the piston is raised within the cylinder to a further extent to elevate the yoke and upper electrode tip 618 to the disengaged position. Because of the floating movement of both the cylinder and piston the air pressure connections are made thereto through flexible hoses 680 and 682 which flexible hoses are detachably secured to ports 684 and 686 extending through the support bracket 600. The upper electrode block 648 is suitably water cooled by a bore 688 leading thereinto and a concentric tube 690 leading substantially to the bottom of the bore, water being circulated through the tube 690 into the bore and thence out through the outlet 692. The lower electrode block is cooled by a copper water-carrying tube 694 lying in a U-shaped groove 696 extending around the edge and the underside of the electrode block 614.

By reason of the construction described it will readily appear that upon the disablement of any gun, the same may be quickly substituted by another gun without great loss of time by simply sliding the cylinder from the supporting bracket after disconnection of the electrical connections, air connections and water cooling connections. Likewise electrode tips may be quickly replaced by merely unscrewing the tip from its adaptor and if difficulty results from removing the tip from the adaptor, the adaptor may be removed from its block by loosening its associated threaded fastening means, it being understood that the adaptor engages the threaded fastening means with a U-slot 617.

It will be understood that the electrode supporting blocks are constructed of a metal high in electrical conductivity as well as strength and that the electrode tips themselves may be made of a special alloy such as Mallory metal. The yokes in order to supply sufficient strength are preferably made of stainless steel and the parts in general around the gun are of such materials as would be non-magnetic and unaffected by the heavy currents and magnetic fields produced thereby.

For the automatic operation of the apparatus, the wiring diagram may have the arrangement as illustrated in Figure 27. As shown therein a source of three-phase current appears as at 696 which is adapted to operate the valve cam shaft operating motor 512 through the magnetically controlled relay 698. The control of this relay is effected through a starting button 700 and the table operated switch 554 which energizes the magnet 699 of the relay 698, see Figure 19. The table operated switch also closes the circuit to the welding transformer timer 702 which is in circuit with the cam operated switch 520 shown in Figure 19. Thus upon the table moving to the proper position for welding the motor 512 is set in motion and at the same time the timer is connected so as to cause the welding transformers to be energized upon each impulse produced by the cam operated switch 520.

Upon the completion of all the welds the table is separated from the work by reason of the cam operated valve 546 and upon the separation of the table, switch 554 is opened causing termination of the supply of current to the welding transformer. Subsequently the cam operated switch 548 is actuated momentarily opening the stop circuit for the motor 512 by breaking the circuit to the magnet 699 of the relay 698 causing the relay to open the circuit to the motor 512 as well as the contacts 704 located in series with the stop switch 706 and cam operated stop switch 548.

Figure 28 illustrates a slightly different circuit employed in connection with the press welder wherein instead of a two-pole cam operated switch 554 a ram operated switch 319 is employed to close the timing circuit and a separate table operated switch 321 is employed to start the valve operating cam shaft motor 210. It will, of course, appear that the circuit shown in Figure 27 may be readily applied to the press welder by employing a two-pole switch such as 554 in place of the switch 321 and by eliminating the ram operated switch 319.

From the foregoing description the operation will readily appear. With the press welder open as is illustrated in Figure 2 a cap strip 30 is inserted and latched in place by the latch members 76 and a channel member 32 inserted in the U-shaped guides 58. While in general the channel members are pressed to shape and are supposed to fit within the U-shaped guides 58, in practice it is often only possible to partially insert the channel member into such position and it is pushed into place upon the lowering of the ram, the cheek members 66 of the guides correctly spacing the flanges of the channel member so as to correctly align with the cap strip 32. The control lever 298 is then lowered to the position shown in Figure 1 shifting the valve 286 to admit fluid pressure to the cylinder 46 lowering the ram 40 bringing the central portion of the cap strip into contact with the central portion of the channel member and by the weight thereof urging the channel member into position in the guides 58. Thereafter the remainder of the ram including the dies 68 and 70 lower forming the cap strip around the contour of the channel member. As the ram nearly completes its lowering movement, the valve 308 is tripped operating the valve 310 to cause fluid pressure to enter the table operating cylinders 120 causing the tables to move toward one another and placing the welding guns in proper welding position. As the table 94 moves into position, the switch 321 is actuated setting the motor 210 in operation, rotating the timer cam 218 at the rate of one revolution per second and the valve operating cam shafts 228—234, the latter being given a step-by-step movement, each step being effected in the time of a second. Upon the lowering of the ram, the switch 319 is closed and thereafter the welding transformers 204 are all energized each time the timer cam 218 makes a revolution, the duration of energization depending upon the setting of the welding timer which may be varied to accommodate different thicknesses of material and welding current required. Through the operation of the cam shafts 228—234 the valves controlling the various welding guns are sequentially actuated and the various welds, twelve in number for each group, effected between the flanges of the channel member and the cap strip. Upon the completion of the welds and the further rotation of the cam shaft 228, the valve 280 is actuated which controls the operation of the valve 310 causing the table operating cylinders 120 to separate the tables. Shortly thereafter and before a complete revolution of the cam shaft 228, the cam operated switch 274 is actuated cutting off the supply of current to the motor 210 whereupon the brake 211 is applied immediately stopping the cam shaft. Simultaneous with the operation of the valve 310 the hand control lever 298 is returned to the upper position as shown in dotted lines in Figure 1 by reason of pressure applied to cylinder 314 and the ram is lifted to the position shown in Figure 2. The channel member may then be ejected by actuation of the ejecting cylinders 320 through actuation of the pedal controlled valve 326 and the channel member and cap strip welded together at spaced points may then be removed from the machine. The channel member and cap strip are thereafter placed in a re-welder 356, the table 426 of the re-welder being separated as is shown in Figure 15 to permit the insertion of the channel member and cap strip. It will be observed that in inserting the channel member in the re-welder it is inverted, thus simplifying the re-welder by not requiring the provision of space for the channel member within the machine. Upon insertion of the channel member upon the guide 418 and in the position shown in Figure 15, the manual valve 480 may be operated energizing the table moving cylinders 452 and causing the table 426 to move to the position shown in Figure 16 and also as shown in Figures 12, 16, 19 and 20. Upon the table 426 moving to the position shown in these figures and assuming the starting button 700 being closed, the cam operated switch 554 is actuated closing a circuit to the motor 512 and setting the cam shaft 510 in operation as well as the timer shaft 516. At the same time the switch 554 completes a circuit to the timer which is then actuated at the rate of one impulse per second by the cam 518 and the timer switch 520. The shaft 510 simultaneously commences its step-by-step movement at the rate of one step per second effecting the welds of the various groups, the welds of each being effected in sequence and upon completion of the welds the cam operated valve 546 causes the table 426 to separate and thereafter the cam switch 548 is actuated opening the connection to the motor 512 and applying its brake 558. As the table 426 separates, the switch 554 is opened, opening the circuit to the welding timer and cutting off the further supply of welding impulses to the bus bars and welding electrodes by the welding transformers. The channel member and its cap strip is then removed from the re-welder 356 and inserted in a re-welder 358 whereupon the same sequence of operations is repeated, and upon the completion of all the welds to be effected in the re-welder 358, the channel member and cap strip are removed therefrom and placed in the re-welder 360 where the operation is again repeated. It will be understood that the position of the welding guns for the various re-welders as well as the welding guns of the press welder will be such as to finally effect a predesired uniform arrangement of spot welds along the flanges of the channel member and the cap strip and that suitable guides such as 353 will be provided in conjunction with each of the re-welders so as to assure the positioning of the channel member and its cap strip in the correct position longitudinally with respect to the welding guns.

Since it will be observed that there are a greater number of operations to be performed in conjunction with the press welder, that is the same must be loaded not only with a channel member but also a cap strip and that time is taken for the operation of the ram in pressing the cap strip into shape about the channel member, the number of welds effected by the press welder are reduced in number so that over-all operation of the press welder may have a time substantially that of the re-welders. This is accomplished by causing the press welder to effect only six welds per group whereas the re-welders in some instances effect seven welds per group. Thus the time interval of one second is saved to allow the operators a sufficient time to perform the additional steps of loading which are required of them. By such means the press welders and re-welders are adapted to be operated in substantially the same length of time so that channel members may be fed through the sequence of machines in a smooth orderly fashion.

It will appear that in both the press welder and the re-welders the welding guns depend downwardly with respect to the flanges in which the welds are to be effected. Thus the welding guns, for example in Figure 1, tend to interfere with one another where the curvature is convex as at 330 and tend to afford plenty of space where the curvature appears concave. This permits the closer spacing of the welding runs where the curvature is concave than where the curvature is convex. However, when the channel member is turned upside down as it is in placing the same in the re-welders, the convex curvature in reality becomes concave and the concave curvature becomes convex thus resulting in the welding guns being crowded at points on the re-welder where space was ample in the press welder. Thus by turning over the channel member as it progresses from the press welder to the re-welders, it is possible to supply the welds in great number and close spacing where greater than normal spacing is required in the press welder. Thus considerable advantage is present in providing the welding guns with the bulk thereof on one side of the flange to be welded and in reversing the channel as it progresses through the series of machines.

While the apparatus has been described as a series of machines for accomplishing a series of operations and producing a finished box girder, it will appear that great similarity exists between the press welder and the re-welders and that they are, in fact, modifications of one another, the press welder being modified from the re-welders by being provided with duplicate table movement and the addition of the press feature.

In both machines, the blocks 100, 102 and 104, 428 and 434 may be quickly changed to suit changes in workpiece shape, and also the dies 68, 70 and 74 may be readily removed and changed by removing the bolts 75.

It will thus appear that an automatic apparatus is provided for effecting closely spaced spot welds along the length of channel members and the like, capable of precise duplication and rapid operation. The apparatus by varying the air pressure on the welding guns and by varying the current as well as the time for welding is capable of great flexibility and adaptability for different thicknesses of metal to be worked upon. Further by changing the shape of the blocks located upon the table and upon which the welding guns are positioned, the apparatus may be readily changed to accommodate changes in shape of the flanged members or workpieces as may be necessary. The apparatus is rugged, repairs such as are necessary due to operation are readily effected without dismantling the entire machine, and duplication of work is assured. In practice apparatus such as herein described is capable of effecting over two hundred uniform sound spot welds in less than fifteen seconds.

While the apparatus has been illustrated as effecting one weld per second, and a complete machine cycle of ten seconds, it will appear obvious that variations may be made in time of effecting a weld, as well as the number effected per machine cycle. Further, the time relation between pressure build up, welding time, dwell and release may be changed to suit conditions and the pressure employed may be varied to suit changes in thickness of metal operated upon.

It will also appear from Figs. 1 and 2 that concave portions of the workpiece are susceptible of being welded at close points because of lack of interference from the bulk of the welding guns depending below, and this is especially desirable since the cap strip must be welded sufficiently frequently along concave curvature to assure its close conformation to the channel member, and to prevent it from arranging itself in chords from weld to weld, which would, if welds were spaced too far apart, result in space between the cap strip and channel. Where the curvature is convex, this obviously is not necessary and the weld spacing may be relatively great.

Though only one example of apparatus is disclosed, however the apparatus being composed of modified forms of a generic structure, it is to be understood that the invention is not limited thereto but may be embodied in various mechanical forms. As many changes in construction, operation and arrangement of the mechanism and parts may be made without departing from the spirit of the invention as will be well understood by those skilled in the art, reference will be had to the appended claims for a definition of the limits of the invention.

This invention relates principally to apparatus having spot welding electrodes of the floating type, that is, in which each electrode is adapted to be movable so that where a number of pairs of separate electrodes are used, as in spot welding, the pressure transmitted to the work by each pair of electrodes will be uniform with the pressure transmitted by each other pair of electrodes to obtain uniformity in the work irrespective of whether the work be of precisely uniform thickness and whether the electrodes are each of exactly the same length. The use of tables, as described, which are capable of being relatively separated laterally to allow the work to be inserted and the pressing ram to operate, and are then adapted to be automatically closed in response to the completion of the ramming operation, facilitates insertion of the work as well as shortening the time necessary for a cycle of operation. Each welding gun contains a fluid pressure device, and is compact since the pressure piston and cylinder are arranged vertically within the gun for direct cooperation with the welding electrodes to avoid any diminution in the power transmitted to the electrodes by the fluid pressure piston and cylinder. The ease of removing any gun upon removal of the electrical and fluid pressure connections aids the rapid operation and servicing of this device.

The disclosed welding gun and its details are the subject matter of applicant's application Ser. No. 408,418, for Welding gun, filed August 27, 1941, and the disclosed method and system of progressively making a series of closely spaced welds form the subject matter of applicant's application Ser. No. 447,495, for Method of and system for spot welding, filed June 18, 1942, both said applications being divisions of the present application.

What is claimed is:

1. In a welding apparatus, a work bed, a work holder mounted on said bed and arranged to hold a flanged channel beam in position with its flanges extending laterally and an associated plate thereagainst, a movable structure such as a table mounted on said work bed for movement laterally toward and away from a flange of the beam held in said work bed and its associated plate, a plurality of welding guns mounted on said structure and arranged in at least one group with their electrodes arranged to embrace the flange of the beam and associated plate held in said holder, means, upon lateral movement of said structure to a position adjacent said work holder, for engaging said welding guns with the flange and associated plate to effect a plurality of welds, and means for restricting the engagement of said guns to one at a time in each group.

2. In a machine for connecting several members such as by welding, a work bed, a work holder mounted on said bed arranged to hold a flanged channel beam in upwardly facing position, a movable head member, arranged to move toward and away from said work holder, a middle clamping member carried by said head for movement toward and away from said work holder, means associated with said middle clamping member for guiding and releasably securing a plate member thereto in proper relation for pressing into engagement with the flanges of a flanged channel beam secured in said work holder, and means for releasing said securing means from a plate member secured thereto by engagement with a flanged channel beam secured in said work holder.

3. In a machine for connecting several members such as by welding, a work bed, a work holder mounted on said bed and arranged to hold a flanged channel beam in upwardly facing position, a movable head member arranged to move toward and away from said work holder, and means on said head member for releasably securing a plate member in proper relation to said work holder, said means being adapted to release a plate held thereby upon engagement with a channel beam held in said work holder.

4. A machine for welding a plate member to a flanged channel member by spot welding the edges of said plate to the channel member flanges, comprising guide means for holding said plate and channel work members, a plurality of spot welding tools arranged in two sets, one set on either side of said work members, said guide means being adapted to hold the plate substantially horizontal and one flange and one edge of the members in proper relative position to one of said sets of welding tools, means for moving the other set laterally and toward the first set into proper position for welding the other flange and edge of said members, means for operating said welding tools in definite sequences to effect welds and means for moving said other set laterally away from said work members, whereby to permit removal of the channel member and plate.

5. Apparatus for welding a cover member to a flanged channel member by spot welding the edges of said cover member to the channel member flanges at frequent intervals along the length thereof comprising a frame, a pair of spaced structures such as tables extending along the length of the frame and substantially the length of the channel member, means for supporting one of said structures for lateral movement toward and away from the other structure, means along the adjacent edges of said structures for supporting a plurality of welding guns, a plurality of substantially vertically floating welding guns secured along the adjacent edges of said structures, means for sequentially operating said guns and support means fixed against longitudinal relative movement with respect to said structures for positioning a channel member and plate with respect to said structures for welding.

6. Apparatus for welding a plate to a flanged member by spot welding the edges of said plate to the member flanges at frequent intervals along the length thereof comprising a frame, a pair of spaced structures such as tables extending substantially along the length of the member, means for supporting one of said structures for movement toward and away from the other structure, means along the adjacent edges of said structures for supporting a plurality of floating welding guns, said support means supporting said welding guns slidably transversely to the plane of the respective adjacent portion of said flanges and means for positioning said member and plate with respect to said structure for welding.

7. In a multiple spot welding machine, a work holder, adapted to hold work pieces with lateral member in which a plurality of welds are to be effected, a plurality of welding guns together with support means therefor adapted to position the guns in proper position with relation to said work holder, to effect a plurality of welds, said welding guns being divided in groups, a transformer permanently connected to each group, fluid pressure means for actuating said guns into welding engagement with the work pieces, and including a valve for each gun said valves being grouped with their respective guns, a cam shaft for actuating one of said valves of each group at a time, a timing shaft and current control timer associated therewith and the transformers, transmission means between said timing shaft and said cam shaft for effecting a step by step movement of the latter, said timing shaft, fluid pressure means, valve for each gun and said valve shaft being adapted to engage a single welding gun of each group with the work pieces and deliver a welding current from all of said transformers to all of said groups during operation of a welding gun of each group with the work pieces.

8. In a multiple spot welding machine, a work holder, adapted to hold a flanged elongated channel member and associated member to be welded to the flanges thereof, a laterally movable support extending parallel with the work holder, means for effecting lateral movement of the support, a plurality of closely spaced fluid pressure operated welding tools on said support adapted to be moved into and out of welding position with respect to the members upon movement of the support, a control valve for each welding tool a cam shaft extending along the length of the holder having a plurality of cams thereon for actuating each control valve, said valves and tools being arranged in groups, a step by step movement for said cam shaft, and means geared thereto and including sources of welding current for each group for energizing each group during the operation of a valve of each group to engage a welding tool, means for starting the movement of said cam shaft upon movement of said support to welding position, and means upon said cam shaft for terminating the rotation thereof causing movement of said support out of welding position upon completion of the welds to be effected.

9. A press welder, comprising a pressing member, and means supporting a pair of welding electrodes movable into and out of welding position, means responsive to substantial completion of the movement of said member to effect movement of said supporting means into operative welding position, and means responsive to completion of welding by said electrodes, for moving said supporting means out of welding position, and for moving said pressing member out of pressing position.

10. A carriage for supporting a plurality of welding guns along an irregular line comprising a table, removable means on said table for providing a proper lineal contour thereof for supporting a plurality of guns, individual brackets for supporting a plurality of guns mounted on said table and removable means and along the said contour thereof, and a welding gun slidably mounted upon each of said brackets.

11. In a welding apparatus, a work bed, a work holder mounted on said bed and arranged to hold a member in position with an edge portion thereof extending laterally and an associated member with an edge portion thereof against the edge portion of the first-named member, a movable support mounted on said work bed for movement laterally toward and away from the edge of the first-named member held in said work bed and its associated member, a plurality of welding guns mounted on said support and arranged in groups with their electrodes arranged to embrace the edges of the members, means, upon lateral movement of said support to a position adjacent said work holder, for engaging said welding guns with the members to effect a plurality of welds along the edges thereof, and means for restricting the engagement of said guns to less than all at a time.

12. A welding apparatus comprising a pair of supports, a pair of welding electrodes carried by each support, means for laterally separating said supports, means whereby a workpiece may be inserted between said supports, means for positioning said workpiece, means for relatively closing said supports whereby said electrodes may cooperate with the work, the welding operation and the opening and closing of said supports being automatic, and manually controlled means for initiating the automatic welding operation, the closing of said supports being responsive to actuation of said manually controlled means, and the opening of said supports being responsive to completion of the welding operation.

13. A welding apparatus comprising a work holder, mechanism for moving a workpiece into position for welding, said mechanism including latches for engaging said workpiece to said mechanism, said work holder and latches being shaped to effect a release of the workpiece by said latches on their cooperation with the work holder or work held by said holder, and means for holding the workpiece in position with respect to the work holder after release of said latches.

14. A machine for effecting a plurality of spaced connections between overlapping marginal portions of two work pieces, comprising guide means for holding said work pieces, a plurality of connecting tools arranged in two sets, one on either side of said work pieces, said guide means being adapted to hold the work pieces in proper relative position to one of said sets of tools for connecting one of the marginal portions of the work pieces, means for moving the other set of tools toward the first set into proper position for connecting the other marginal portions of said work pieces, means for operating said tools in definite sequences to effect connections, and means for moving the said other set laterally away from said work pieces whereby to permit removal of said pieces from the machine.

15. In a welding apparatus, a work bed, a work holder mounted on said bed and arranged to hold a workpiece in a predetermined position; a movable structure mounted on said work bed for movement laterally toward and away from the work held by said work holder; a plurality of spot welding electrodes mounted on said structure arranged to adapt them for contacting the work when said structure is moved toward said work; means, upon lateral movement of said structure to a position adjacent said work holder, for engaging said electrodes with the work to effect a plurality of welds.

WILLIAM A. WEIGHTMAN.